US006090235A

United States Patent [19]

Giusti

[11] Patent Number: 6,090,235

[45] Date of Patent: Jul. 18, 2000

[54] PROCESS FOR FORMATION OF A CONTINUOUS COMPOSITE TAPE FOR THE PRODUCTION OF WRAPPINGS FOR FOOD PRODUCTS

[75] Inventor: Arturo Giusti, Bomario, Italy

[73] Assignee: Policarta S.r.l., Bassano in Teverina, Italy

[21] Appl. No.: 08/825,343

[22] Filed: Mar. 28, 1997

[51] Int. Cl.[7] ...................................................... B32B 31/00

[52] U.S. Cl. .......................... 156/259; 156/211; 156/217; 156/227; 156/252; 156/263; 156/264; 156/270; 156/271; 156/324; 493/224; 493/346; 383/106; 383/109; 229/87.06; 229/87.08

[58] Field of Search .................................... 156/291, 292, 156/305, 259, 263, 264, 271, 252, 253, 267, 324, 270, 55.4, 21.7, 22.7, 211, 258, 304.1, 265; 226/196.1; 493/224, 346; 383/106, 109; 229/87.06, 87.08

[56] References Cited

U.S. PATENT DOCUMENTS

| | | | |
|---|---|---|---|
| 2,425,043 | 8/1947 | Moore | 229/5.84 |
| 2,511,303 | 6/1950 | Stevens et al. | 156/108 |
| 2,668,769 | 2/1954 | Schlienz | 383/211 |
| 5,165,799 | 11/1992 | Wood | 383/8 |
| 5,195,829 | 3/1993 | Watkins et al. | 383/100 |
| 5,226,735 | 7/1993 | Beliveau | 383/106 |
| 5,410,857 | 5/1995 | Utley | 53/410 |

FOREIGN PATENT DOCUMENTS

| | | |
|---|---|---|
| 0520350 | 12/1992 | European Pat. Off. . |
| 1434411 | 6/1966 | France . |
| 2594805 | 8/1987 | France . |
| 93U000031 | 3/1997 | Italy . |

*Primary Examiner*—Richard Crispino
*Assistant Examiner*—Linda L Gray
*Attorney, Agent, or Firm*—Browdy and Neimark

[57] ABSTRACT

A machine and a process for formation of a continuous composite tape for the production of wrappings for food products, along with the tape and a wrapping formed using the same; the machine being such that it includes; supply means to provide materials for forming the tape, a unit for bonding of said materials, applicator groups to apply glue on the materials and on the continuous composite tape thus formed, devices for applying the glue along preferred areas; the process being such that it includes the operations of application of the glue on preferred areas of the continuous composite tape and of bonding thereof; the wrapping being such as to provide a perforated flap at its opening and a layer of glue capable of allowing sealing during the packing operation.

22 Claims, 11 Drawing Sheets

PROCESS FOR FORMATION OF A CONTINUOUS COMPOSITE TAPE FOR THE PRODUCTION OF WRAPPINGS FOR FOOD PRODUCTS

BACKGROUND OF THE INVENTION

1. Field of the Invention

The present invention relates to a machine and a process for formation of a continuous composite tape of laminated sheet material, in particular porous paper, and translucent material, in particular transparent film, for the production of wrappings for food products, including hot ones, as well as the tape and wrapping thus obtained.

The implementation modes according to the present invention of forming such a continuous composite tape provide the application of glue along preferred areas of the tape, so as to obtain a uniform thickness and allow the tape to be re-wound onto a spool without problems caused by the overlapping of the various layers one on the other, as well as to avoid intimate contact of the food product being inserted with the glue.

The composition of a continuous composite tape according to the present invention is such as to allow both transpiration of the product introduced during packing, and visibility of said product when on display. The bag-type wrapping formed starting from said continuous tape is also characterized by improved closure after introduction of the product, and also improved transportability along the food product insertion line, even when the food product in question is a hot one.

A preferred use of continuous composite tapes according to the present invention relates to the production of wrappings particularly suited to the introduction of bakery products, and in particular bread. These products, unlike what can be seen in present packing systems (Kraft paper, micro-perforated film, plastic film, paper of various types), if introduced while still hot, are thus able to preserve both their fragrance and their organoleptic properties.

2. Description of the Prior Art

Machines and processes are known for the production of wrapping for bakery products. However, neither these machines nor the processes according to the prior art provide for glue application along preferred areas of the continuous composite tape forming the wrapping, and they do not provide the production in roll form of a continuous composite tape allowing the packing of hot foot products.

Also known, Italian utility model application RM-93-U-000031, is a packing comprising a bag wrapper with folded sides made of a specific type of porous paper that has the characteristic of allowing dry food products to be introduced into it at high temperatures of up to 100°, and of allowing the exchange of gas between the inside and the outside of said packing, in order to preserve the organoleptic properties of the products placed therein.

This packing, however, is sealed using known methods, and it is not provided that said scal be formed by tempering a layer of glue applied along preferred areas within the packing itself.

SUMMARY OF THE INVENTION

The above prior art problems are solved by the machine and the process for formation of a continuous composite tape, as well as the product and a packing obtained in this way according to the present invention. For this purpose a machine is provided for formation of a continuous composite tape of a material for the production of packings in which to wrap food products, said tape being formed by laminated sheet material and translucent material, said machine comprising along a line for production of said tape:

- first supply means for supplying said laminated sheet material in a tape form;
- second supply means for supplying said translucent material in a tape form, to be combined with said continuous tape of laminated sheet material;
- a first applicator group to apply glue on the translucent material or on the laminated sheet material, or on both;
- a bonding unit to bond the laminated sheet material to the translucent material to form the continuous composite tape;
- a second applicator group to apply glue on the laminated sheet material or on the continuous composite tape, said glue to be applied in a transversal direction with respect to the direction of movement of said tape, along preferred areas of the laminated sheet material or of the continuous composite tape; and
- a third applicator group to apply glue on the laminated sheet material or on the continuous composite tape, in a longitudinal direction with respect to the direction of movement thereof, along preferred areas of the laminated sheet material or of the continuous composite tape, the arrangement of said preferred areas being such that a substantially uniform thickness is obtained in the continuous composite tape and the contact between the food product and the glue is avoided.

Further objects and embodiments of the present invention are set down in the independent claims thereof.

In particular a process for the formation of a continuous composite tape of material for the production of wrappings in which to pack food products, formed by laminated sheet material and translucent material is provided.

Furthermore a continuous composite tape formed with said process and a bag-shaped wrapping formed by said tape are provided.

The present invention will be described with reference to three preferred embodiments, intended as non-limiting examples. In a first embodiment the composite tape is formed from two side strips of laminated sheet material, for example porous paper, between which a strip of translucent material, for example transparent film, is placed. In a second embodiment the tape is formed by three strips of laminated sheet material, for example porous paper, two side strips and one central strip, between which two strips of translucent material, for example transparent film, are placed. Finally, in a third embodiment the tape is formed by a strip of laminated sheet material, for example porous paper, with a series of openings onto which the translucent material, for example transparent material, is bonded.

As a specific example of porous paper it is possible to use, in the above embodiments, a paper having the following general characteristics:

| | Min | Max |
|---|---|---|
| Basic weight (UNI 6440) gr/m$^2$ | 30 | 100 |
| Thickness (UNI 6441) micron | 80 | 150 |
| Longitudinal tensile strength (UNI 6438/2) kN/m | 1.8 | 5.9 |
| Transversal tensile strength (UNI 6438/2) kN/m | 0.8 | 4.2 |
| Stretch % (UNI 6438/2): | | |
| longitudinal breakage kN/m | 0.9 | 2.9 |

-continued

| | Min | Max |
|---|---|---|
| transversal breakage kN/m | 2.0 | 7.8 |
| Resistance to burst (UNI 6443) kPa · $m^2$/gr | 2.0 | 8.2 |
| Gurley air permeability factor (UNI 7629/4) | <5 | <10 |
| As an example of a specific type of translucent material, cellophane having the following general characteristics may be used in the above embodiments: | | |
| Basic weight (UNI 6440) gr/$m^2$ | 25 | 80 |
| Thickness (UNI 6441) micron | 20 | 30 |
| Longitudinal tensile strength (UNI 6438/2) kN/m | 1.0 | 3.0 |
| Transversal tensile strength (UNI 6438/2) kN/m | 0.5 | 4.0 |
| Stretch % (UNI 6438/2): | | |
| longitudinal breakage kN/m | 4.0 | 12.0 |
| transversal breakage kN/m | 15 | 35 |

It is known to the applicant that the use of this type of porous paper allows the resulting product to be introduced into temperatures of up to 100°, without any need for cooling, which would cause a degeneration in the properties of the product itself, and further allowing transpiration of the product containing residual humidity, so as not only to preserve the organoleptic characteristics of the product, but actually to improve them.

BRIEF DESCRIPTION OF THE DRAWINGS

Reference will be made to the enclosed figures, in which the same reference numbers will be used for the same parts.

When referring to the above figures, they must not be taken to be drawn in scale.

DETAILED DESCRIPTION OF THE INVENTION

Figure 1:
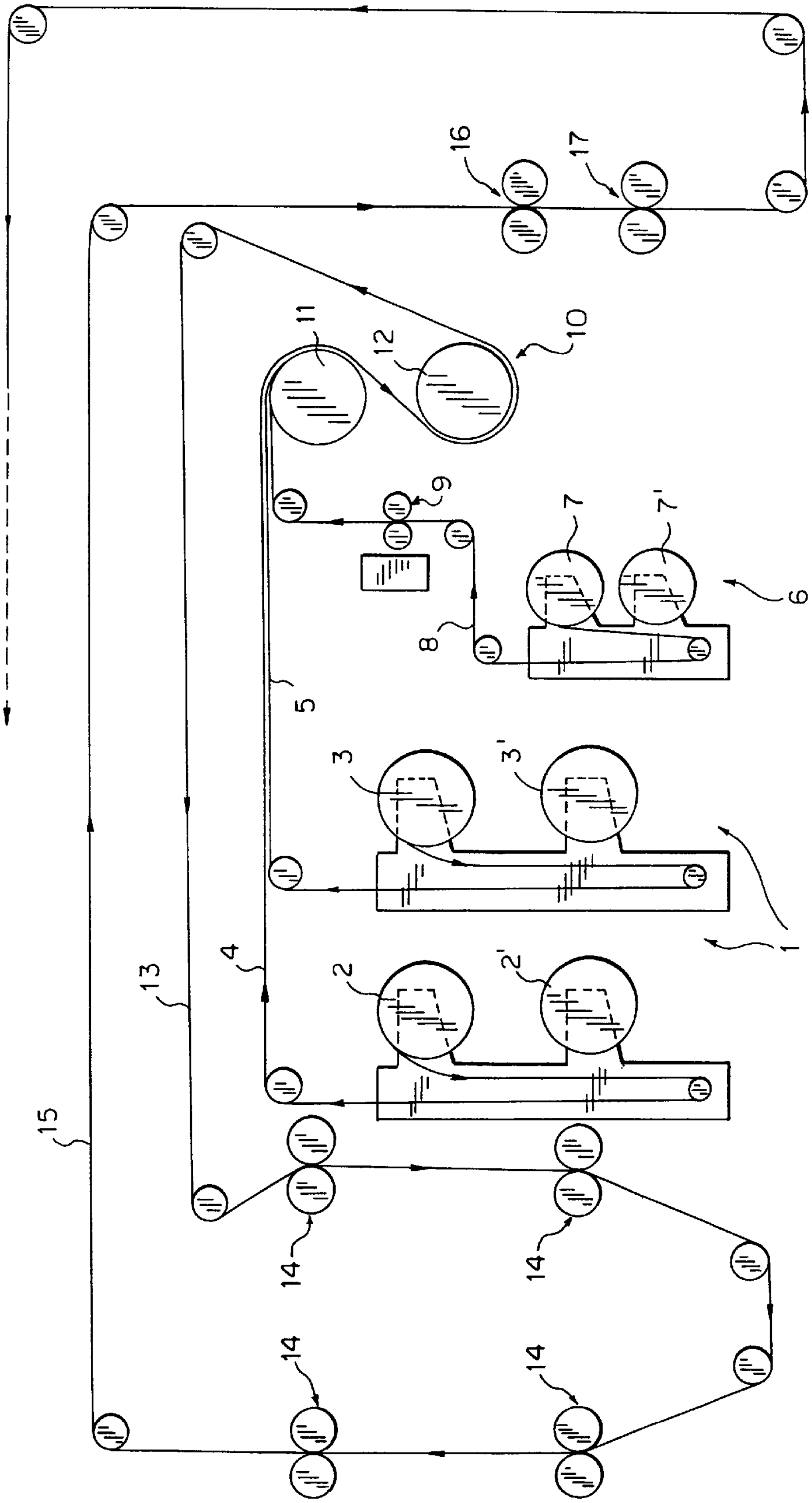
FIG. 1 shows a general plan view from the side of a first embodiment of the machine according to the invention.

With reference now to FIG. 1, an overall plan view of a first embodiment of the machine according to the invention is shown. This machine represents a continuous production line for a composite tape of laminated sheet material, for example porous paper, and of translucent material, for example transparent film, in which there are first supply means, for example rotating reel means, indicated as a whole in 1, to feed along two different lines the laminated sheet material in the form of a continuous tape. In the preferred embodiment shown in the figure, the laminate sheet material, unwinding from reels 2, 3, is carried along two lines 4, 5.

Second supply means 6 are then provided to carry the translucent material along a single line in the form of a continuous tape. In the preferred embodiment shown in the figure, the transparent material, unwinding from reel 7, is carried along the line 8.

Alongside the above mentioned rotating reel means 2, 3, 7 there can also be provided a device, not shown in the figure, for the automatic replacement of reels 2', 3', 7', on reels 2, 3, and 7, respectively.

Along the line 8, downstream of the reels 7, 7', there is a first applicator group 9 for application of glue on the translucent material. The mode of said application will be described in detail when referring to the following FIG. 2. Alternatively, it is possible to apply glue on the laminated sheet material, or on both the laminated sheet material and the translucent material.

Continuing in the description of FIG. 1, after application of the glue on the translucent material, the lines carrying the continuous tapes of laminated sheet material and translucent material are conveyed in a bonding unit 10, made up of rollers 11, 12, in which bonding of the tape of laminated sheet material advancing along the lines 4,5 to the tape of translucent material takes place. In the preferred embodiment a system of hot rollers is provided for this purpose which, on contact, tend to speed up the process of adhesion between the laminated sheet material and the translucent material; alternatively, this adhesion can be forced by means of fans or by means of any other process or device suited for this purpose.

In this way, a continuous composite tape of laminated sheet material and translucent material is formed, which is subsequently dried, for example by air, along line 13. After the drying stage, the continuous composite tape is made to pass through printing groups, which aim is to mark thereon possible indications relating to the product, lettering indicating the manufacturer's name and style, or the like. These printing groups, which are indicated as a whole in 14, do not form an object of the present invention and will not be described in detail.

Following passage through the printing groups 14, the continuous composite tape is dried once again, for example by air, along the line 15 and then made to pass through a second applicator group 16, diagrammatically indicated in the figure, for a first application of glue, in particular heat-sealable varnish, thereon; the arrangement within the production line and the structure of said second applicator group, as well as the mode used to apply the heat-sealable varnish on the continuous composite tape, will be described in detail with reference to FIG. 3.

Figure 4:
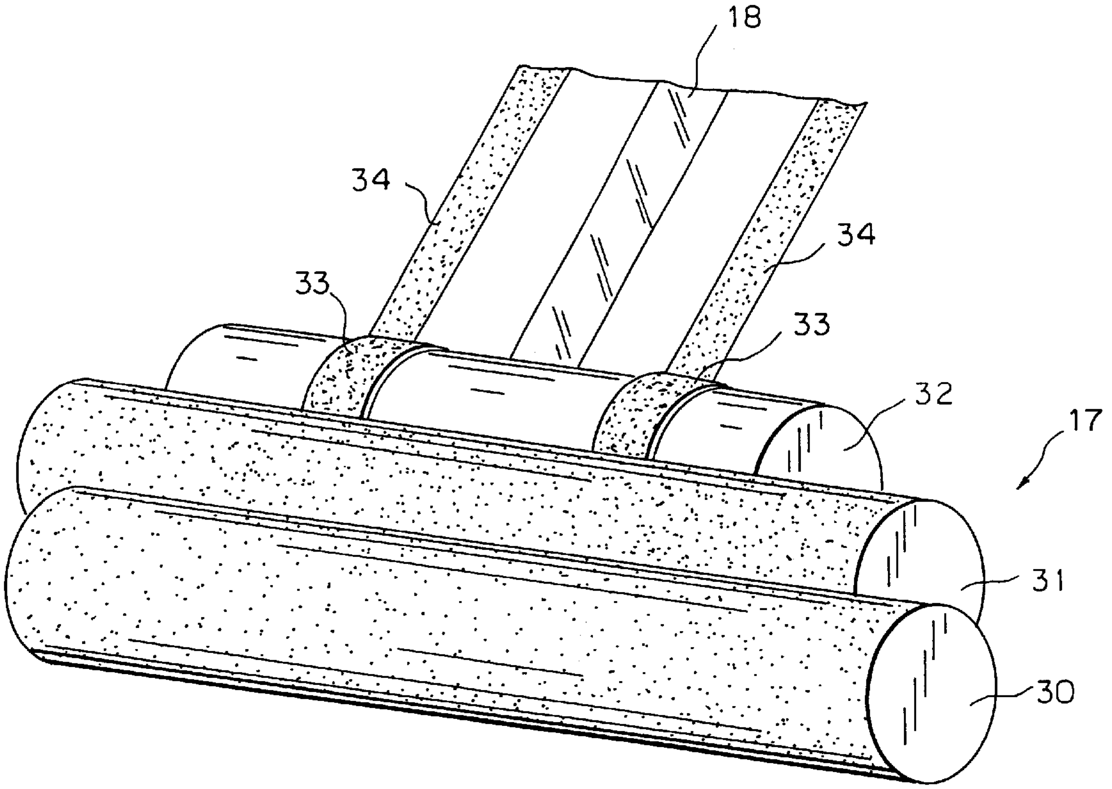
FIG. 4 shows a partial perspective view of a third applicator group for longitudinal application of the glue on the continuous composite tape.

Once it has passed through the second applicator group 16, the continuous composite tape can be dried before passing through a third applicator group 17, also diagrammatically illustrated in the figure; the arrangement and structure of said third applicator group, as well as the application mode of the heat sealable varnish, will be more clearly understood from the description given with reference to FIG. 4. An alternative embodiment may provide for the glue application operations to take place before printing of the continuous composite tape. Following passage through the third applicator group, the tape will be dried, for example by air, before entering either a re-rolling device, or a bag production line, not shown in the figure.

Figure 2:
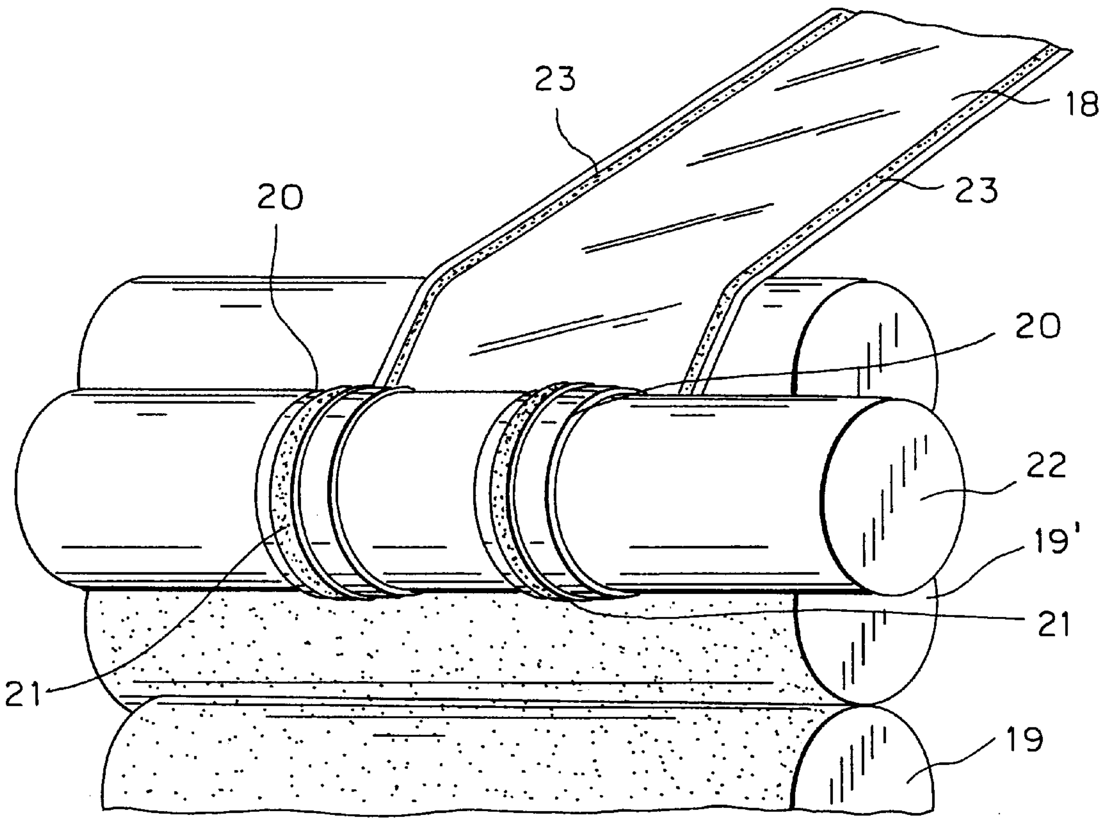
FIG. 2 shows a partial perspective view of a first applicator group for application of the glue on the translucent material.

With reference now to FIG. 2, a description will be given of the modes used for application of the glue on the layer 18 of translucent material before the operation of bonding to the laminated sheet material. The preferred embodiment shown here preferably provides for use of a single-component, self-cross-linking, water based glue substance that does not cause spray phenomena, or alternatively heat-sealable and/or vinyl glue, preferably for use with hot, dry food products, applied on the translucent material. Alternative embodiments are however possible, in which application of the glue substance is on the laminated sheet material, or on both the laminated sheet material and the translucent material. The applicator group comprises a first cylinder 19, which aim is to take up the glue and transfer it by rotation to the cylinder 19'; the amount of glue to be transferred is determined by the pressure between said cylinders 19 and 19'; the glue on cylinder 19' is then transferred to two rubber dampers 20, on which protruding areas 21 in which the glue is present are highlighted. The two dampers 20, of a substantially circular ring shape, are arranged around a cylinder 22, spaced one from the other in such a way as to allow continuous application of glue in a direction longitudinal to the direction of movement of the tape 18 and along the areas 23 close to the edge thereof. The width of the protruding areas 21 serves to set the width of said areas 23; said areas 21 are elevated on the surface of the damper 20 in order not to impregnate the latter and thus alter the thickness of the glue to be transferred onto the tape of transparent material.

Figure 3A:
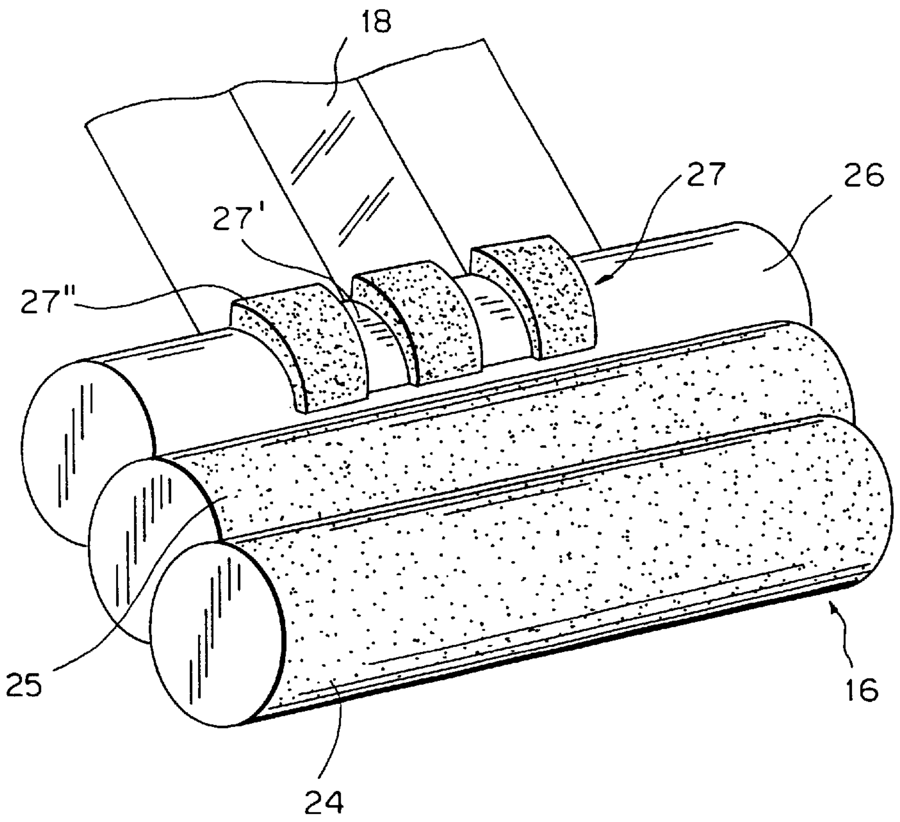
FIG. 3A shows a partial front perspective view of a second applicator group for transversal application of the glue using a device capable of allowing the glue to be applied along preferred areas of the continuous composite tape.

Reference will now be made to FIG. 3A, in which a partial perspective view is shown of the applicator group, indicated as a whole with 16, comprising the cylinders 24, 25 and 26, as well as a rubber damper 27. The cylinder 24 takes up the glue, in particular heat-sealable varnish, not shown in the figure, which is then transferred by rotation to the cylinder 25; the amount of glue to be transferred is determined by the pressure between said cylinders 24 and 25; the glue on the cylinder 25 is then transferred onto cylinder 26, on which is arranged, extending partially over the side surface thereof, a rubber damper 27. This rubber damper is shaped in such a way as to have hollow areas 27' and protruding areas 27". The glue transferred onto cylinder 26 by the cylinder 25 will impregnate the rubber damper 27. The shape of the surface of damper 27 allows the glue to be applied along preferred areas of the continuous composite tape. Said damper 27, in fact, when brought into contact with the continuous composite tape by rotation of the cylinder 26, will allow glue to be applied only along the areas of the continuous composite tape that correspond to the protruding areas 27' of the damper. The size of the cylinder 26, which can be adjusted at will during design of the machine, along with that of the gears associated therewith, will allow a rate of transversal application on the tape selectable according to the packing requirements that may change from time to time. Furthermore, the shape of the damper 27 can vary in such a way as to vary the area on which the glue is applied transversally.

Transversal application on areas of the heat-sealable varnish is particularly advantageous during the final re-winding operation of the continuous composite tape, described with reference to the preceding FIG. 1. The areas in which the heat-sealable varnish is absent, in fact, allow re-winding of the continuous composite tape without the single turns, due to the effect of the increased pressure in the area in which the laminated sheet material and translucent material overlap, tending to adhere to each other. In this manner, said areas also allow the transpiration characteristic of the porous paper to be maintained, as well as avoiding any contact between the food product and the glue substance, once said food product has been inserted into the wrapping.

For a more detailed description of the areas of the continuous composite tape on which the glue is applied, reference will be made to the description of FIG. 5.

The heat-sealable varnish applied in the manner described above can be reactivated by heat during hermetic sealing, for example by pinching, of the food product wrapping obtained subsequently.

Figure 3B:
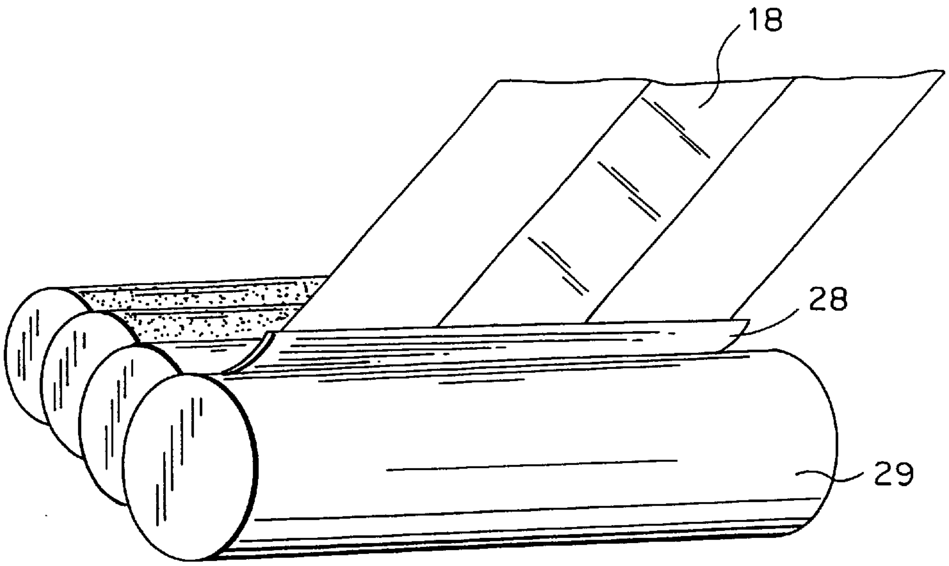
FIG. 3B shows a partial perspective rear view of the applicator group of FIG. 3A, in which a device for scraping away excess glue is more clearly seen.

With reference now to FIG. 3B, a scraper device 28 is shown, positioned on cylinder 29. The function of this device 28 is to eliminate any excess glue that accumulates on the cylinder 29 following migration of said glue through the continuous composite tape during the transversal application of the heat-sealable varnish. The excess varnish, scraped off using the device 28, is collected in suitable baths, not shown in the figure. The shape of said device can be that shown in the figure as an example, or any other shape that is capable of carrying out the above operations on the cylinder. This functional element, described in particular with reference to the applicator group 16 of FIG. 3A, can be provided on all the glue or heat-sealable varnish applicator groups described in the present invention, with the same aim as those described above.

With reference now to FIG. 4, a further applicator group is shown, indicated as a whole with 17, comprising the cylinders 30, 31 and 32, for longitudinal application of the glue along the direction of movement of the continuous composite tape. The cylinder 30 takes up the glue, in particular heat-sealable varnish, not shown in the figure, which is then transferred by rotation to the cylinder 31; the amount of glue to be transferred is determined by the pressure between said cylinders 30 and 31; the glue on the cylinder 31 is then transferred onto cylinder 32, on which are arranged, extending partially over the side surface thereof, two rubber dampers 33. Said rubber dampers have the shape of rings, and are arranged around the cylinder 32. In FIG. 4, for example, a flat surface arrangement of the dampers 33 is shown, so as to allow uniform application of glue along the longitudinal areas of the continuous composite tape. The longitudinal application modes can, however, vary according to necessity. The dampers 33 are separated from each other in such a way as to allow application of heat-sealable varnish along the edge areas 34 of the tape. This application takes place along areas that do not overlap with those involved in the preceding transversal application described with reference to the preceding figure. It is possible to change the distance between said dampers for any longitudinal applications of varnish that do not necessarily involve the edge areas.

For a more detailed description of the areas of the continuous composite tape on which the heat-sealable varnish is applied, reference will now be made to FIG. 5, in which a partial plan view of the continuous composite tape 35 will be shown, following application of the glue according to the modes described with reference to FIGS. 3A, 3B, and 4.

Figure 5:
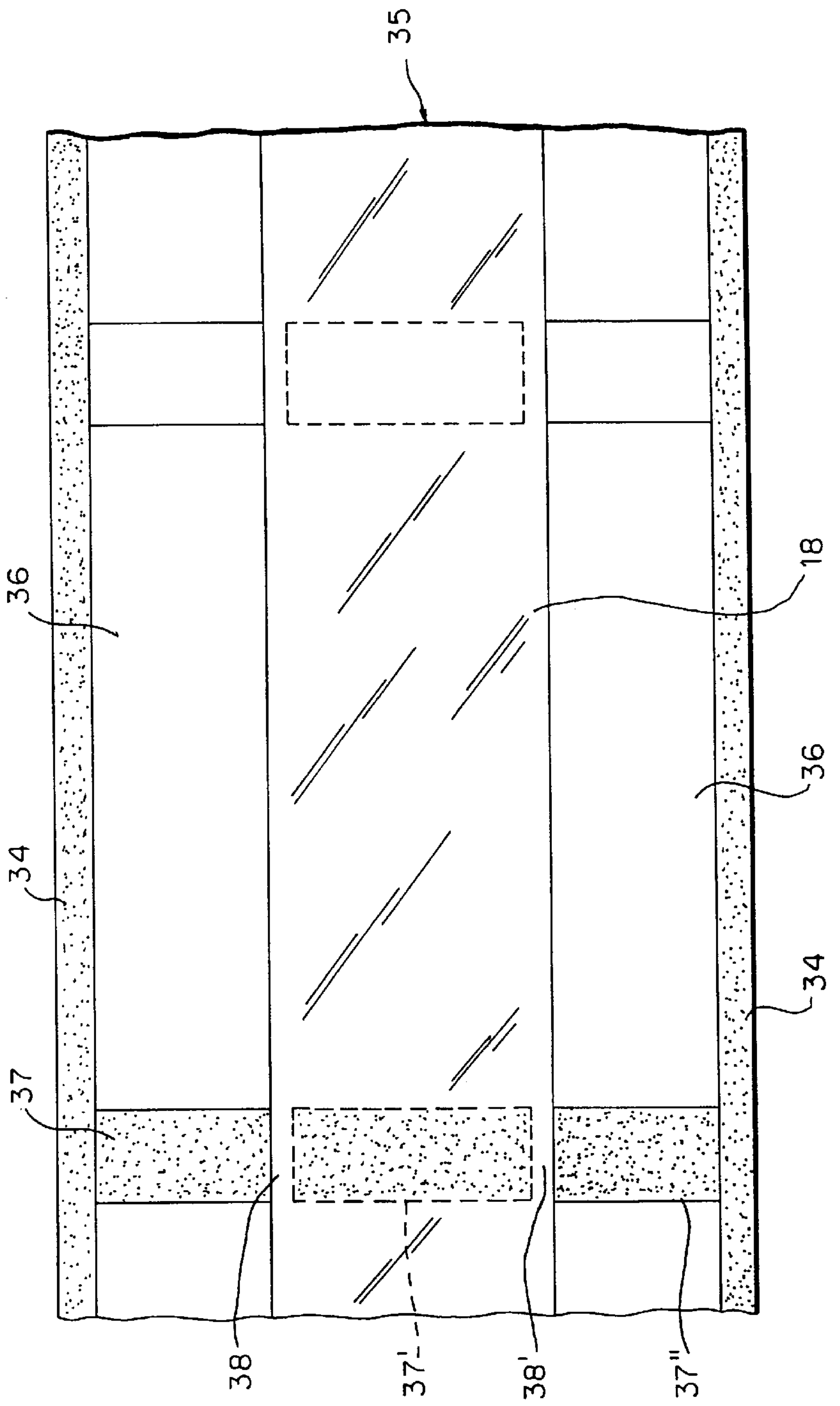
FIG. 5 shows a partial plan view of the continuous tape of laminated sheet material and of translucent material according to the invention, following transversal and longitudinal application of glue.

In FIG. 5, the composite tape 35 is shown in the form of the first embodiment thereof, with the layer of translucent material 18 interposed between the two layers 36 of laminated sheet material. Areas 37, 37', 37" are visible, said areas being involved in application of the heat-sealable varnish, carried out using the rubber damper 27. In particular, said areas correspond to the pressure excerpted on the composite tape by the damper 27 by means of its protruding areas 27". The areas 38, 38', in which the glue is not applied, correspond, on the other hand, to the hollow areas 27' of the rubber damper 27.

Also visible are the areas 34 involved in longitudinal application of the glue, carried out using the additional applicator group 17.

Figure 6:
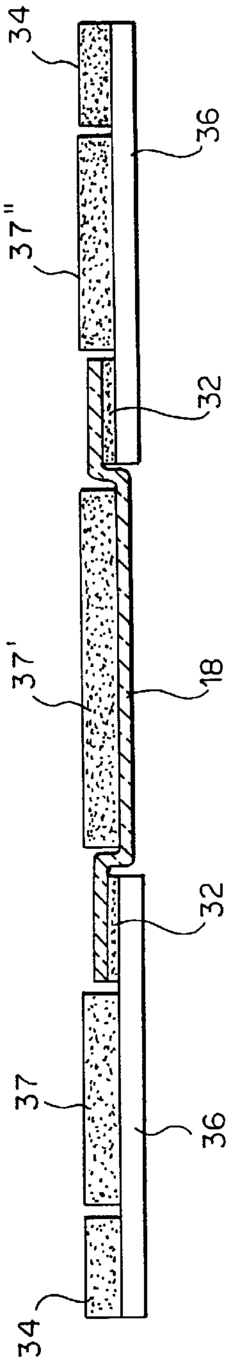
FIG. 6 shows a sectional view of the continuous composite tape according to the invention, in which the layered structure of the materials of which it is made can be seen.

The effect and the significance of application of the glue along preferred areas, as described above, can be more clearly seen with reference to the following FIG. 6, in which a cross section view of the continuous composite tape is shown, relating to the areas of transversal application of the heat-sealable varnish. In said figure the two materials making up the continuous composite tape are shown, as well as the three different layers of glue applied thereon: the laminated sheet material 36, the translucent material 18, the glue 32, the transversally applied heat-sealable varnish 37, 37', 37" and the longitudinally applied heat-sealable varnish 34. From this figure is easy to see that the overall thickness of the composite tape is such as to result substantially uniform along the whole cross section thereof. This uniformity of thickness allows re-winding of the tape without any adhesion between one layer and the next, which, because of the strong pressure exercised during the re-winding operation, might cause the heat-sealable varnish to temper, due to a lack of uniform thickness.

Figure 7:
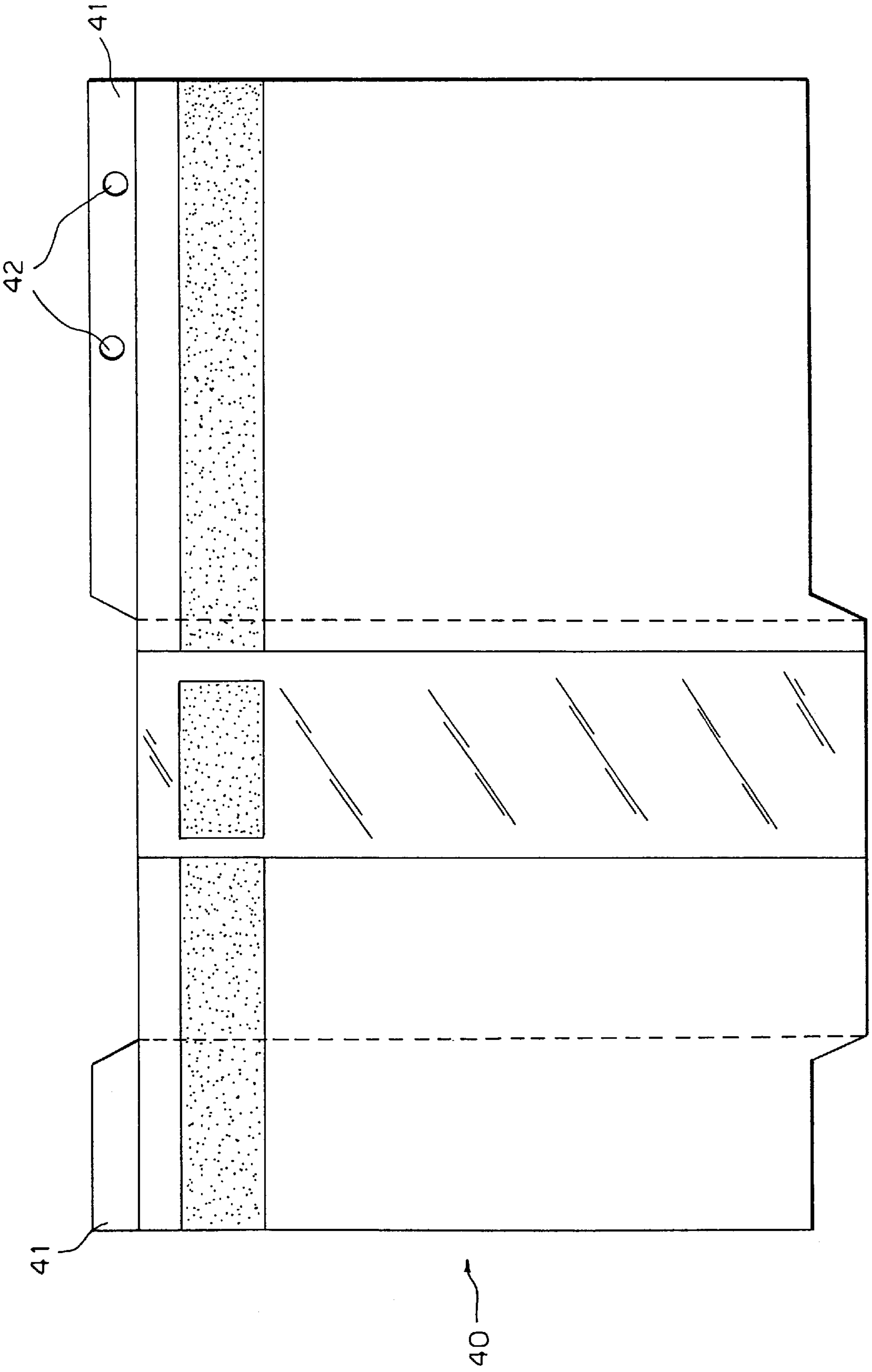
FIG. 7 is a plan view of a flat blank from which to obtain a bag shaped wrapping.

In FIG. 7, to which reference will be made henceforth, a possible embodiment of a flat blank element is shown, from which a bag shaped wrapping can be obtained by means of folding and gluing operations, said element being made of the continuous composite tape of porous paper and transparent material having the general characteristics described above. The porous paper can have a basic weight (UNI 6440) preferably of between 30 and 100 gr/m$^2$.

A sheet element of this kind, indicated as a whole in 40, has in particular a panel 41 with two holes 42. This panel is generally known as a "flap". Within the present invention, the presence of a perforated flap on the mouth of the bag, once formed, is useful in order to improve insertion of the bags in groups into the hermetic sealing machine, after tempering of the transversal strip of heat-sealable resin. In a device of this kind, the groups of bags are anchored to the hooks thanks to the presence of the perforated flap, and are carried to the machine for introduction of the product and hermetic sealing. Said flap 41 thus allows the bags to be piled up, and to enter the high temperature food product insertion line and facilitate the operation of inserting the food product itself.

Figure 8:
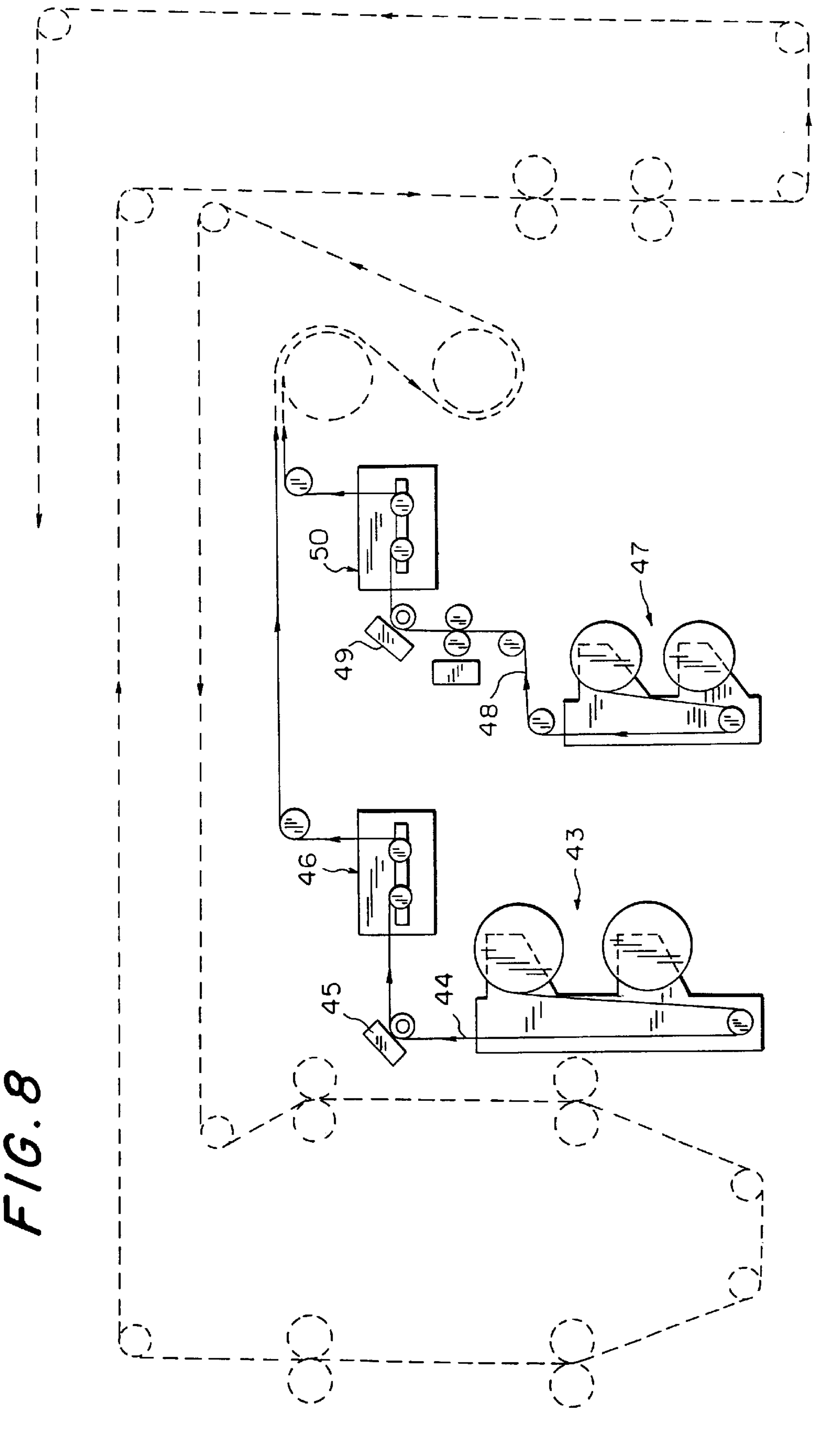
FIG. 8 shows a partial plan view from the side of the second embodiment of the machine according to the invention.

Reference will now be made to FIG. 8, which shows a partial plan view from the side of a second embodiment of the machine according to the invention. In the figure, the parts in common with the embodiment of FIG. 1 are indicated by dotted lines. In this embodiment, the tape will be formed by three strips of laminated sheet material, for example porous paper, two side strips and one central strip, between which two strips of translucent material, for example transparent film, are placed. Using this second embodiment, it is possible to double the amount of composite tape proceeding along the production line with respect to the previous embodiment. In this embodiment, means are provided, for example rotating reel means, indicated as a whole in 43, to carry the laminated sheet material in continuous tape form along a single line. The width of the tape of laminated sheet material unwinding from the reel 43 is double to that of the one provided in the first embodiment referred to in the machine of FIG. 1. In the preferred embodiment of FIG. 8, the laminated sheet material unwinding from the reel 43 is carried along the line 44. This tape then passes through a first cutting group 45, shown schematically, the function of which is to cut the tape along its direction of movement so as to divide it longitudinally into three parts, two side parts and one central part, as will be indicated in the following with reference to FIGS. 9A to 9E. The tape of laminated sheet material then enters a first directing unit indicated schematically in 46 and made up preferably of rotating cylinders or directing and positioning bars, which aim is to re-position the side parts with respect to the central part, in a manner that will likewise be shown with reference to FIGS. 9A to 9E. Second rotating reel means 47 are also provided to carry the translucent material, for example transparent film, in tape form along a single line. The width of the tape of translucent material unwinding from the reel 47 is double to that of the one provided in the first embodiment referred to in the machine of FIG. 1. In the preferred embodiment of the figure, the translucent material unwinding from the reel 47 is carried along the line 48. This tape then passes through a second cutting group 49, shown schematically, the function of which is to cut the tape along its direction of movement so as to divide it longitudinally into two parts, as will be indicated in the following with reference to FIGS. 10A to 10E. The tape of translucent material then enters a second directing unit indicated schematically in 50 and made up preferably of rotating cylinders of directing and positioning bars, which aim is to re-position the two parts, in a manner that will likewise be shown with reference to FIGS. 10A and 10E. From this point onward the tape proceeds as indicated with reference to FIG. 1.

Figure 9A:
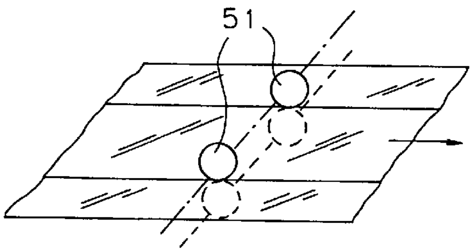
FIGS. 9A to 9E show a series of partial perspective views of a first detail of the second embodiment of the machine according to the invention.
Figure 9B:
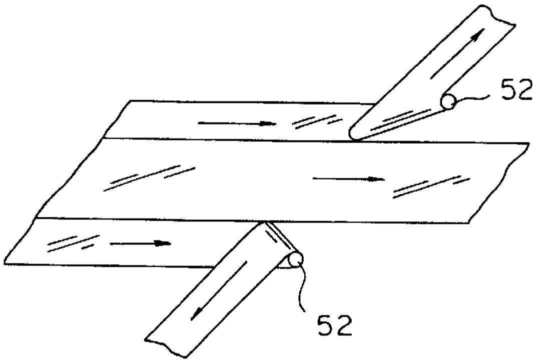
Figure 9C:
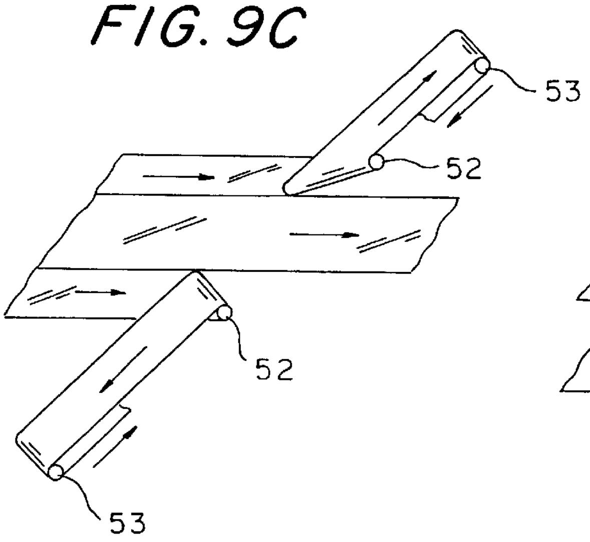
Figure 9D:
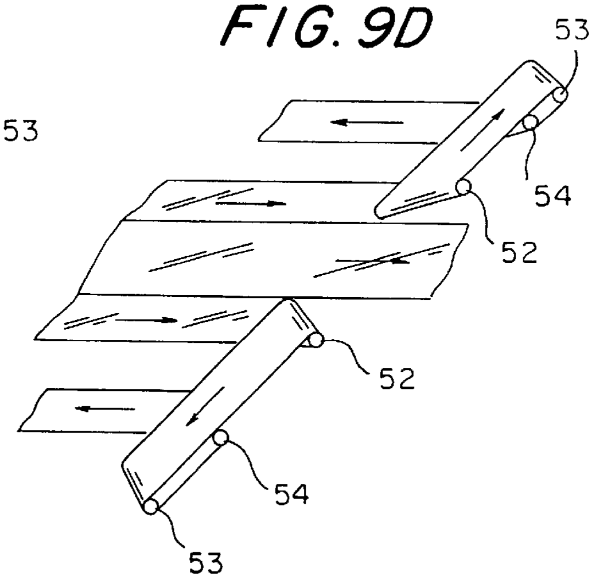
Figure 9E:
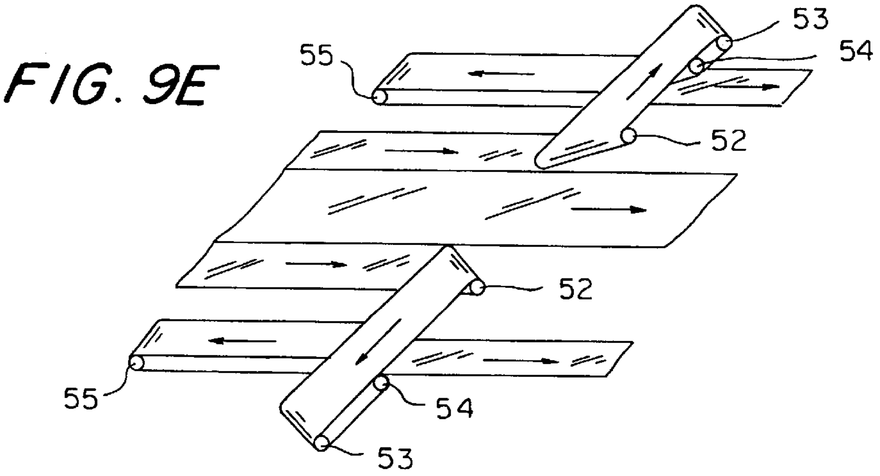

With reference now to FIGS. 9A to 9E, a series of partial perspective views are shown, indicating in succession the operations that take place inside the first directing unit 46 of FIG. 8; in FIG. 9A a cutting device 51 is present to cut the tape of laminated sheet material along its direction of movement so as to divide it longitudinally into two side parts and a central part. In FIG. 9B first directing means 52 are shown, for example rotating cylinders or bars, to direct each of said side parts out at an angle of 90° in a direction perpendicular to the direction of movement before cutting. In FIG. 9C, in addition to the first cylinders 52, second directing means, for example cylinders 53 are shown to subsequently reverse the sense of movement of each of said side parts by 180°. In FIG. 9D, in addition to the first and second directing means 52, 53, third directing means, for example cylinders 54 are shown to subsequently direct each of said side parts out at an angle of 90° with respect to their direction of movement, in such a way that said side parts take on a direction parallel and in the opposite sense to the direction of movement before cutting. The arrangement of these third directing means 54 is such that each of the side parts of the tape of laminated sheet material can be separated from the central part thereof by a distance equal to approximately the width of the tape of translucent material which is subsequently to be bonded to the tape of laminated sheet material; the positioning of the third directing means 54 can be adjusted so as to adapt to different widths of the tape of translucent material. Finally, in FIG. 9E all the directing-positioning cylinders are shown, comprising also fourth directing means, for example cylinders 55, which subsequently reverse the sense of movement of catch of said side parts by 180°, so that they take on a direction of movement parallel to and in the same sense as the direction of movement before cutting.

Figure 10A:
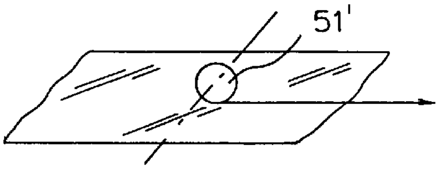
FIGS. 10A to 10E show a series of plan views of a second detail of the second embodiment of the machine according to the invention.
Figure 10B:
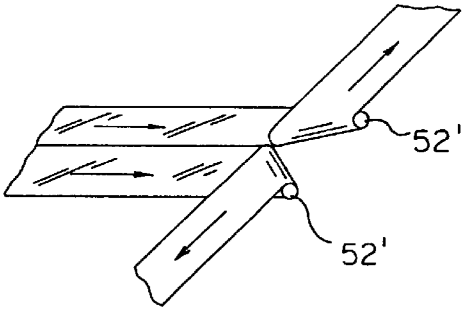
Figure 10C:
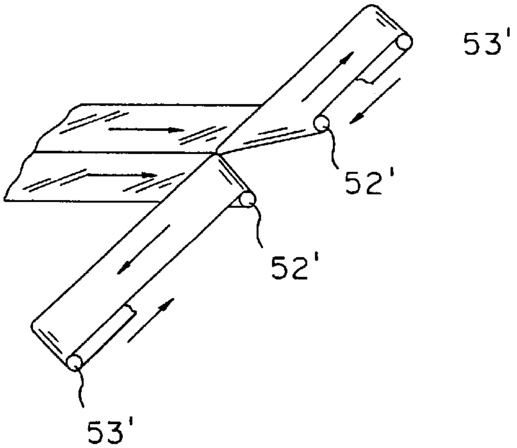
Figure 10D:
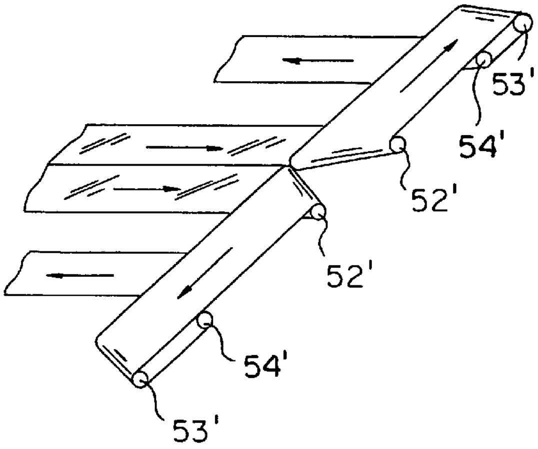
Figure 10E:
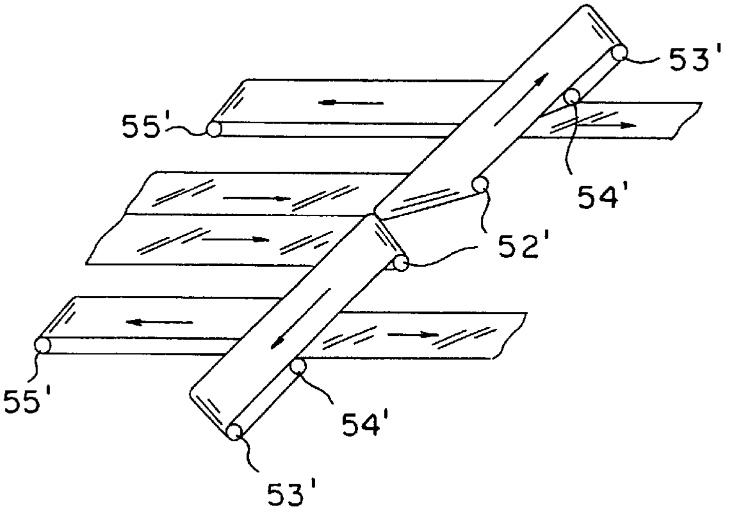

With reference now to FIGS. 10A to 10E, a series of partial perspective views are shown, indicating in succession the operations that take place inside the second directing unit 50 of FIG. 8; in FIG. 10A a cutting device 51' is present to cut the tape of translucent material along its direction of movement so as to divide it longitudinally into two parts; in FIG. 10B fifth directing means, for example cylinders or bars 52' are shown to direct each of said parts of the tape of translucent material out at an angle of 90° in a direction perpendicular to the direction of movement before cutting; in FIG. 10C, in addition to the fifth directing means 52', sixth directing means, for example cylinders 53' are shown to subsequently reverse the sense of movement of each of said parts of the tape of translucent material by 180°; in FIG. 10D, in addition to the fifth and sixth directing means 52', 53', seventh directing means, for example cylinders 54' are also shown to subsequently direct each of said parts of the tape of translucent material out at an angle of 90° with respect to their direction of movement before cutting. The arrangement of these seventh directing means 54' is such that each of the parts of the tape of translucent material can be separated from the each other by a distance such to allow subsequent bonding thereof with between the central part and each of the side parts, respectively, of the tape of laminated sheet material; the positioning of the seventh directing means 54' being adjustable so as to adapt to different dimensions of both the tape of translucent material and the tape of laminated sheet material. Finally, in FIG. 10E all the directing means are shown, comprising eight directing means 55', which subsequently reverse the sense of movement of each of said parts of the tape of translucent material by 180°, so that they take on a direction of movement parallel to and in the same sense as the direction of movement before cutting.

It is understood that said first, second, third, fourth, fifth, sixth, seventh and eight directing means for directing the tape of laminated sheet material or of translucent material are preferably rotating cylinders or directing and positioning bars.

In this way it is possible to pass along the production line a double amount of composite tape compared to the preceding embodiment. With this purpose it will be necessary to provide, by means of obvious modifications to the description given above, a further longitudinal application of glue along the central area of said tape, as well as a cutting device that divides the composite tape in two along the center before said tape is re-wound in the reel.

The present invention has been described up to this point with reference to two preferred embodiments thereof, given merely as non-limiting examples.

An alternative to the embodiments shown up to this point can, for example, provide that the transversal and longitudinal application take place in a single applicator group; a further variation provides cylindrical devices or spray guns for the spread of liquid products for the treatment and impregnation of the laminated sheet material or the translucent material.

A third embodiment is that providing the formation of a series of openings in the laminated sheet material. These openings may have a wide variety of forms, according to the choices made during the design stage. The translucent material will then be bonded on the areas in which these openings have been made. Applications of glue, in particular heat-sealable varnish, both transversal and longitudinal, can occur on the laminated sheet material, for example before said bonding.

Figure 11:
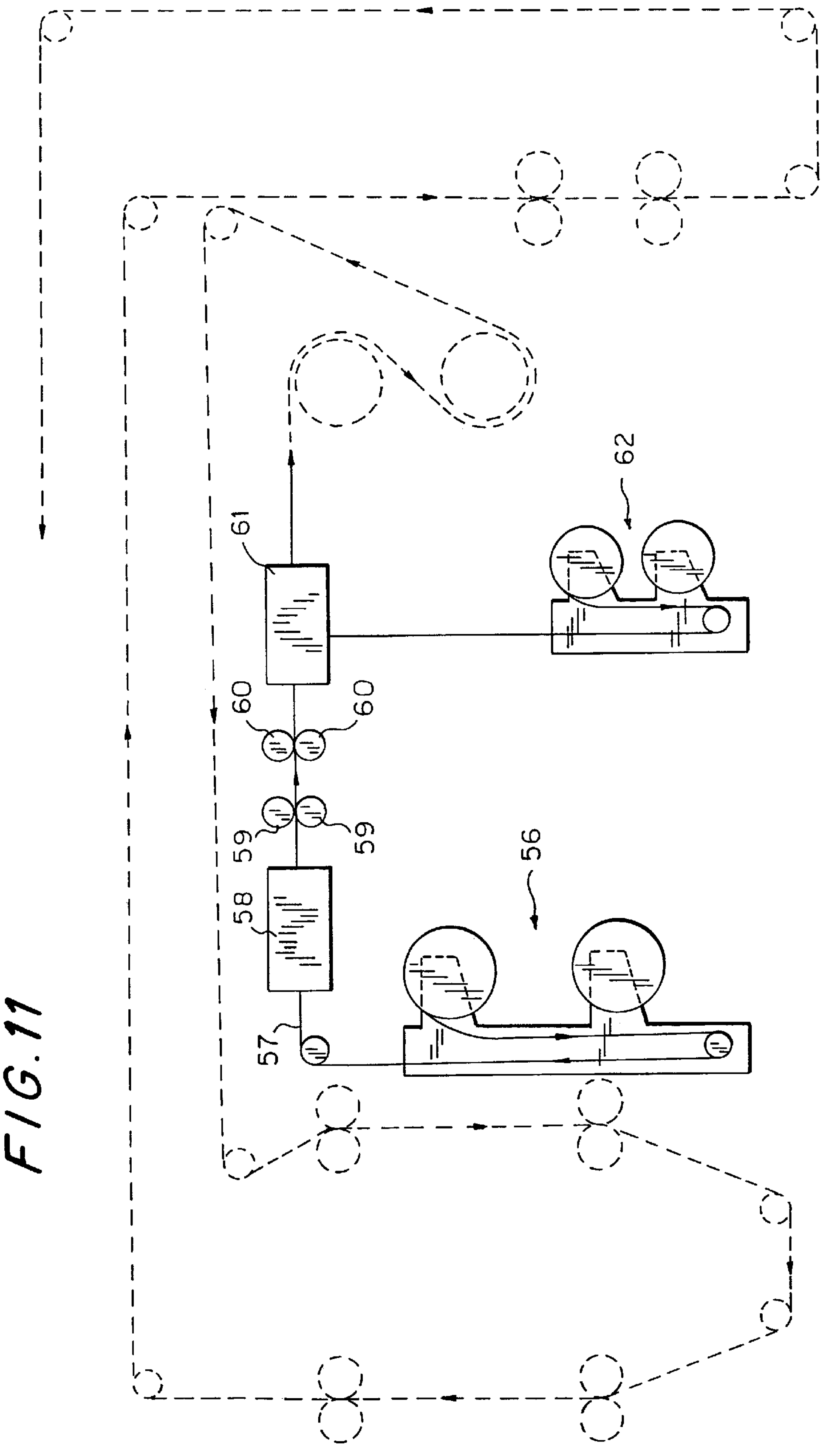
FIG. 11 shows a partial plan view from the side of the third embodiment of the machine according to the invention.

FIG. 11 shows a partial plan side view of said third embodiment of the machine according to the invention; in this embodiment there are provided first supply means, for example rotating reel means, indicated as a whole in 56, to supply the laminated sheet material in continuous tape form. In the embodiment shown in the figure, the laminated sheet material, unrolling from the reel 56, is supplied along the line 57. A group 58 is then provided to blank the tape of laminated sheet material and to extract the blanked sections. This group is indicated only schematically, as its structure does not form a part of the present invention. Inside said group, openings will be made in the tape of laminated sheet material. The tape of laminated sheet material is made to pass through first and second applicator groups 59, 60 shown schematically in the figure, for a first and second application of glue, in particular heat-sealable varnish, thereon. The mode of application of the glue by the groups 59, 60 is identical to that outlined for the previous embodiments, which provide a group for transversal application of glue along preferred areas of the laminated sheet material and a group for longitudinal application of glue on the laminated sheet material. The tape of laminated sheet material is then made to pass through a group 61 for application of the film of translucent material on the areas of the tape of laminated sheet material from which the shaped section has been extracted; this film is supplied by second supply means, for example rotating reel means 62. It is to be understood that the group 61 comprises means for the correct timing and correct positioning of the areas of transparent film. Finally, the parts already described in the preceding embodiments are indicated with a dotted line.

Upon the above description it is to be intended that a further object of the present invention is a process for the formation of a continuous composite tape of material for the production of wrappings in which to pack food products, formed by laminated sheet material and translucent material, comprising the operations of bonding the laminated sheet material to the translucent material to form the continuous composite tape and applying glue on the continuous composite tape in a direction transversal to the direction of movement thereof, along preferred areas.

A further object is a process for the formation of a continuous composite tape of material for the production of wrappings in which to pack food products, formed by laminated sheet material and translucent material, comprising the operations of applying glue on the laminated sheet material in a direction transversal to the direction of movement thereof, along preferred areas and bonding the laminated sheet material to the translucent material to form the continuous composite tape.

Both processes can further comprise the operation of applying the glue on the laminated sheet material or on the translucent material along edge areas thereof, in a longitudinal direction with respect to their direction of movement, in such a way that it does not overlap the areas along which the glue is applied transversally. The processes can comprise the operation of blanking the tape of laminated sheet material and of extracting the blanked section.

A further feature of said processes consists in the operations of:

- cutting the tape of laminated sheet material along its direction of movement in such a way as to divide it longitudinally into two side parts and one central part;
- subsequently directing each of said side parts outwards in a direction perpendicular to the direction of movement before cutting;
- subsequently reversing the sense of movement of each of said side parts by 180°;
- subsequently directing each of said side parts out at an angle of 90° with respect to their direction of movement, in such a way that said side parts take on a direction parallel and in the opposite sense to the direction of movement before cutting, so that each of the side parts of the tape of laminated sheet material is separated from the central part thereof by a distance equal to approximately the width of the tape of translucent material which is subsequently to be bonded to the tape of laminated sheet material; and
- subsequently reversing the sense of movement of each of said side parts by 180°, so that they take on a direction of movement parallel to and in the same sense as the direction of movement before cutting, and possibly in the further operation of:

- cutting the tape of translucent material along its direction of movement in such a way as to divide it longitudinally into two parts;
- directing each of said parts of the tape of translucent material outwards in a direction perpendicular to the direction of movement before cutting;
- subsequently reversing the sense of movement of each of said parts of the tape of translucent material by 180°;
- subsequently directing each of said parts of the tape of translucent material out at an angle of 90° with respect to their direction of movement, in such a way that said parts take on a direction parallel and in the opposite sense to the direction of movement before cutting, so that each of said parts of the tape of translucent material is separated from the other by a distance such to allow subsequent bonding thereof to the tape of laminated sheet material between its central part and each of its side parts, respectively; and
- subsequently reversing the sense of movement of each of said parts of the tape of translucent material by 180°, so that they take on a direction of movement parallel to and in the same sense as the direction of movement before cutting.

Finally, a further object of the present invention is a continuous composite tape formed with the processes above defined. This tape is formed by strips of the translucent material alternating longitudinally with strips of the laminated sheet material. Alternatively, the continuous composite tape can be formed by laminated sheet material having a series of openings onto which the translucent material has been bonded.

An example of a specific embodiment of the continuous composite tape according to the invention provides the use of paper with the following general characteristics:

| | |
|---|---|
| Basic weight (UNI 6440) gr/m$^2$ | 57 |
| Thickness (UNI 6441) micron | 110 |
| Longitudinal tensile strength (UNI 6438/2) kN/m | 2.8 |
| Transversal tensile strength (UNI 6438/2) kN/m | 1.4 |
| Stretch % (UNI 6438/2): | |
| longitudinal breakage kN/m | 1.8 |
| transversal breakage kN/m | 2.5 |
| Resistance to burst (UNI 6443) kPa · m$^2$/gr | 2.8 |
| Gurley factor (UNI 7629/4) | <5 |

As an example of a specific type of translucent material, cellophane having the following general characteristics may be used:

| | |
|---|---|
| Basic weight (UNI 6440) gr/m$^2$ | 37 |
| Thickness (UNI 6441) micron | 25 |
| Longitudinal tensile strength (UNI 6438/2) kN/m | 1.6 |
| Transversal tensile strength (UNI 6438/2) kN/m | 1.6 |
| Stretch % (UNI 6438/2): | |
| longitudinal breakage kN/m | 7.5 |
| transversal breakage kN/m | 23 |

Among other things, it is possible to provide that the cellophane, or any other type of translucent material used in place thereof, be provided with microperforations on the part of its surface that is free of gluing substances.

Figure 12:
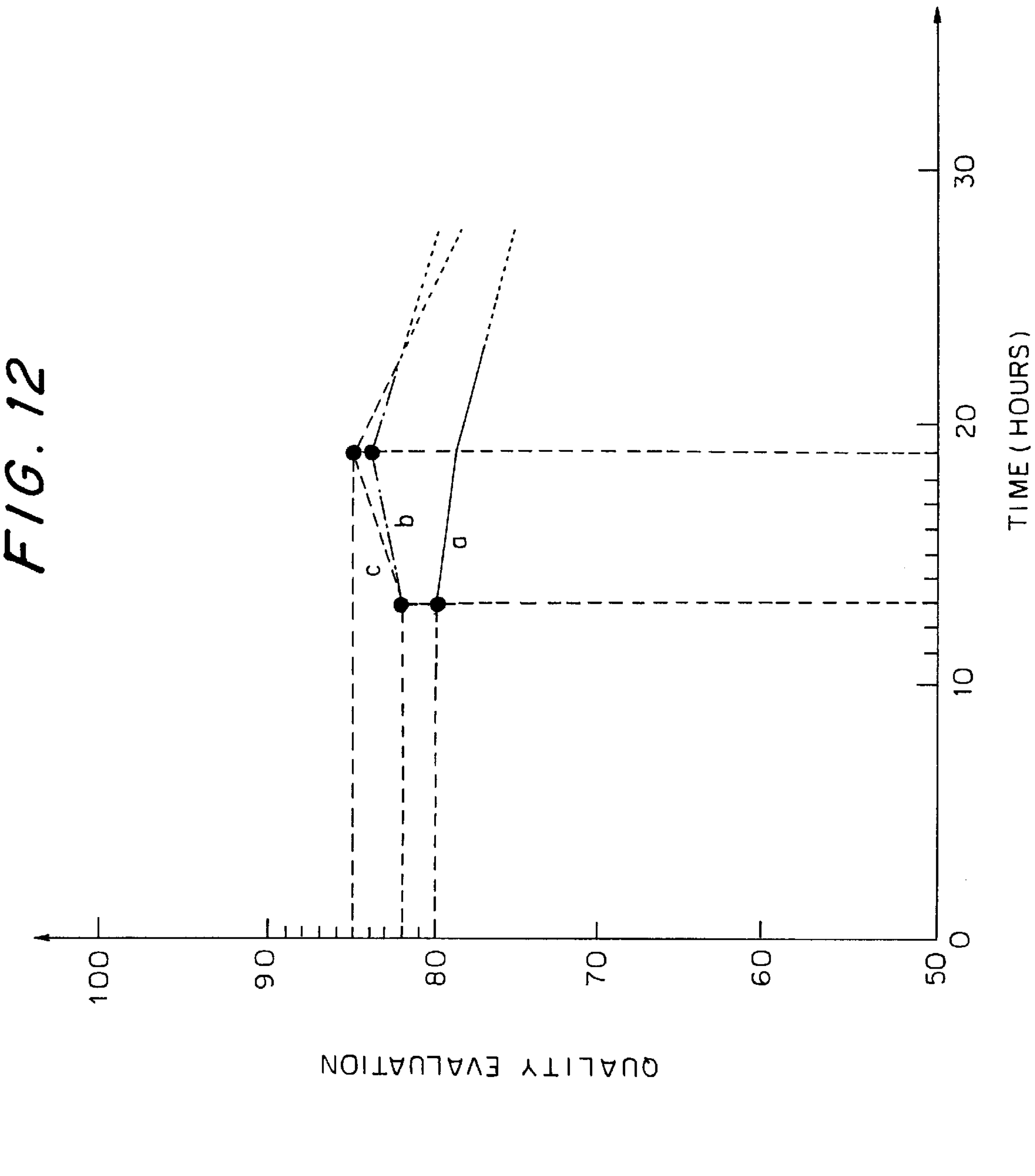
FIG. 12 shows a diagram of a series of degeneration curves for the food product, underlining the improved preservation characteristics with the continuous composite tape.

Using the specific characteristics given above, FIG. 12 shows, as a specific example of embodiment, a series of degeneration curves for "Pugliese" or home-baked type bread, in which the horizontal axis shows the time (in hours) and the vertical axis shows a scale of product quality, evaluated by tasting. This scale goes from 50 (insufficient) to 100 (excellent). In this graph, the curve "a", drawn with a continuous line, indicates the degeneration of bread cooled in a traditional way and subsequently introduced into a normal perforated film wrapping according to the prior art. The curve "b", indicated by a dotted and dashed line, shows the degeneration of bread which is introduced into the wrapping formed using the composite tape according to the invention straight from the oven, and therefore not cooled. Finally, curve "c", shown as an ordinary dotted line, indicates the degeneration of bread that is cooled in a traditional way and then introduced into the wrapping made using the composite tape according to the invention.

It is easy to see that the characteristics of quality of the product in curves "b" and "c", which provide the use the composite tape according to the invention, are greatly increased. In particular, curve "b", although it has characteristics of quality lower than those of curve "c", enables production to be speeded up, as it does not require the time necessary to cool the product.

What is claimed is:

1. A process for forming a continuous composite tape of material for producing wrappings for packaging of food products, formed by laminated sheet material and translucent material, whereby the food products are visible through the translucent material, comprising the steps of:

- applying bonding glue to at least one of the laminated sheet and the translucent material and bonding the laminated sheet material to the translucent material to form the continuous composite tape, said continuous composite tape being formed by strips of the translucent material alternating longitudinally with strips of the laminated sheet material, each said strip of translucent material being placed between two said strips of laminated sheet material;

applying wrapping-forming glue to the continuous composite tape in a direction transverse to the movement thereof along the first preferred areas;

applying wrapping-forming glue to the continuous composite tape in a direction longitudinal to the movement thereof, along second preferred areas; and drying said wrapping-forming glues;

wherein said wrapping-forming glues are used to bond the tape to form the wrappings in a subsequent step.

2. The process according to claim 1 wherein said laminated sheet material is porous paper having a basic weight (UNI 6440) of from 30 to 100 g/m$^2$ and a Gurley air permeability factor (UNI 7629/4) of a value from <5 seconds to a value of <10 seconds.

3. The process according to claim 1 wherein said translucent material has micro-perforations on the part of its surface that is free of the glues.

4. The process according to claim 1 wherein a bag-shaped wrapping is formed by said continuous composite tape.

5. The process according to claim 4 wherein said bag-shaped wrapping further comprises a perforated flap at its mouth for piling of the wrapping during entry into a high temperature food product insertion line and to facilitate insertion of the food product itself.

6. The process according to claim 4 wherein closure of said bag-shaped wrapping after introduction of the food product is effected by tempering said layer of glue applied transversely with respect to the direction of movement of the tape.

7. A process for forming a continuous composite tape of material for producing wrappings in which to pack food products, formed by laminated sheet material and translucent material, whereby the food products are visible through the translucent material, comprising the steps of:

applying wrapping-forming glue to the laminated sheet material in a direction transverse to the direction of movement thereof, along first preferred areas;

applying wrapping-forming glue onto the laminated sheet material in a direction longitudinal to the direction of movement thereof, along second preferred areas;

drying said wrapping-forming glues; and applying bonding glue to at least one of the laminated sheet and the translucent material and bonding the laminated sheet material to the translucent material to form the continuous composite tape, said continuous composite tape being formed by strips of the translucent material alternating longitudinally with strips of the laminated sheet material, each said strip of translucent material being placed between two said strips of laminated sheet material;

wherein said wrapping-forming glues are used to bond the tape to form the wrappings in a subsequent step.

8. The process according to claim 7 further comprising blanking the laminated sheet material and extracting the blanked section.

9. The process according to claim 8 wherein said laminated sheet material is porous paper having a basic weight (UNI 6440) of from 30 to 100 g/m$^2$ and a Gurley air permeability factor (UNI 7629/4) of a value from <5 seconds to a value of <10 seconds.

10. The process according to claim 8 wherein said translucent material has micro-perforations on the part of its surface that is free of the glues.

11. The process according to claim 8 wherein a bag-shaped wrapping is formed by said continuous composite tape.

12. The process according to claim 11 wherein said bag-shaped wrapping further comprises a perforated flap at its mouth for piling of the wrapping during entry into a high temperature food product insertion line and to facilitate insertion of the food product itself.

13. The process according to claim 11 wherein closure of said wrapping after introduction of the food product is effected by tempering said layer of glue applied transversely with respect to the direction of movement of the tape.

14. The process according to claim 7 wherein said laminated sheet material is a porous paper having a basic weight (UNI 6440) of from 30 to 100 g/m$^2$ and a Gurley air permeability factor (UNI 7629/4) of a value from <5 seconds to a value of <10 seconds.

15. The process according to claim 7 wherein said translucent material has micro-perforations on the part of its surface that is free of the glues.

16. The process according to claim 7 wherein a bag-shaped wrapping is formed by said continuous composite tape.

17. The process according to claim 16 wherein said bag-shaped wrapping further comprises a perforated flap at its mouth for piling of the wrapping during entry into a high temperature food product insertion line and to facilitate insertion of the food product itself.

18. The process according to claim 16 wherein closure of said bag-shaped wrapping after introducing of the food product is effected by tempering said layer of glue applied transversely with respect to the direction of movement of the tape.

19. A process for forming a continuous composite tape of material for producing wrappings in which to pack food products, formed by laminated sheet material and translucent material, whereby the food products are visible through the translucent material, comprising the steps of:

providing two strips of translucent material;

cutting a laminated sheet material along its direction of movement to form three strips including two side parts and one central part;

subsequently directing each of the side parts outwardly in a direction perpendicular to the direction of movement before cutting;

subsequently reversing the direction of movement of each of the side parts by 180 degrees;

subsequently directing each of the side parts out at an angle of 90 degrees with respect to their direction of movement, in such a way that the side parts take on a direction parallel and in the opposite direction to the direction of movement before cutting, so that each of the side parts is separated from the central part thereof by a distance equal to approximately the width of the two strips of translucent material;

subsequently reversing the direction of movement of each of the side parts by 180 degrees, so that they take on a direction of movement parallel to and in the same direction as the direction of movement before cutting;

applying bonding glue to at least one of (a) the strips of laminated sheet material or (b) the strips of translucent material and bonding the strips of laminated sheet material to the strips of translucent material to form the composite tape;

applying wrapping-forming glue to the tape in a direction transverse to the movement thereof, along first preferred areas;

applying wrapping-forming glue to the tape in a direction longitudinal to the movement thereof, along second preferred areas; and drying the wrapping-forming glues;

wherein said wrapping-forming glues are used to bond the tape to form the wrappings in a subsequent step.

20. A process for forming a continuous composite tape of material for producing wrappings in which to pack food products, formed by laminated sheet material and translucent material, whereby the food products are visible through the translucent material, comprising the steps of:

providing two strips of translucent material;

cutting a laminated sheet material along its direction of movement to form three strips including two side parts and one central part;

subsequently directing each of the side parts outwardly in a direction perpendicular to the direction of movement before cutting;

subsequently reversing the direction of movement of each of the side parts by 180 degrees;

subsequently directing each of the side parts out at an angle of 90 degrees with respect to their direction of movement, in such a way that the side parts take on a direction parallel and in the opposite direction to the direction of movement before cutting, so that each of the side parts is separated from the central part thereof by a distance equal to approximately the width of the two strips of translucent material;

subsequently reversing the direction of movement of each of the side parts by 180 degrees, so that they take on a direction of movement parallel to and in the same direction as the direction of movement before cutting;

applying wrapping-forming glue on the strips of laminated sheet material in a direction transversal to the direction of movement thereof, along first preferred areas;

applying wrapping-forming glue on the strips of laminated sheet material in a direction longitudinal to the direction of movement thereon, along second preferred area;

drying said wrapping forming glues; and applying bonding glue to at least one of (a) the strips of laminated sheet material or (b) the strips of translucent material and bonding the strips of laminated sheet material to the strips of translucent material;

wherein the wrapping forming glues are used to bond the tape to form the wrappings in a subsequent step.

21. A process for forming a continuous composite tape of material for producing wrappings in which to pack food products, formed by laminated sheet material and translucent material, whereby the food products are visible through the translucent material, comprising the steps of:

providing three strips of laminated sheet material;

cutting a translucent material along its direction of movement to form two strips including two side parts;

subsequently directing each of the side parts outwardly in a direction perpendicular to the direction of movement before cutting;

subsequently reversing the direction of movement of each of the side parts by 180 degrees;

subsequently direction each of the side parts out at an angle of 90 degrees with respect to their direction of movement, in such a way that the side parts take on a direction parallel and in the opposite direction to the direction of movement before cutting, so that the side parts are separated by a distance;

subsequently reversing the direction of movement of each of the side parts by 180 degrees, so that they take on a direction of movement parallel to and in the same direction as the direction of movement before cutting;

applying bonding glue to at least one of (a) the side parts or (b) the strips of laminated sheet material and bonding the strips of laminated sheet material to the strips translucent material to form the composite tape;

applying wrapping-forming glue to the tape in a direction transverse to the movement thereof, along first preferred areas;

applying wrapping-forming glue to the tape in a direction longitudinal to the movement thereof, along second preferred areas; and drying the wrapping-forming glues;

wherein said wrapping-forming glues are used to bond the tape to form the wrappings in a subsequent step.

22. A process for forming a continuous composite tape of material for producing wrappings in which to pack food products, formed by laminated sheet material and translucent material, whereby the food products are visible through the translucent material, comprising the steps of:

providing three strips of laminated sheet material;

cutting a translucent material along its direction of movement to form two strips including two side parts;

subsequently directing each of the side parts outwardly in a direction perpendicular to the direction of movement before cutting;

subsequently reversing the direction of movement of each of the side parts by 180 degrees;

subsequently direction each of the side parts out at an angle of 90 degrees with to their direction of movement, in such a way that the side parts take on a direction parallel and in the opposite direction to the direction of movement before cutting, so that the side parts are separated by a distance;

subsequently reversing the direction of movement of each of the side parts by 180 degrees, so that they take on a direction of movement parallel to and in the same direction as the direction of movement before cutting;

applying wrapping-forming glue on the strips of laminated sheet material in a direction transversal to the direction of movement thereof, along first preferred areas;

applying wrapping-forming glue on the strips of laminated sheet material in a direction longitudinal to the direction of movement thereon, along second preferred area;

drying said wrapping forming glues; and applying bonding glue to at least one of (a) the strips of laminated sheet material or (b) the strips of translucent material and bonding the strips of laminated sheet material to the strips of translucent material;

wherein the wrapping forming glues are used to bond the tape to form the wrappings in a subsequent step.

* * * * *